June 4, 1968    P. S. ARNOLD ET AL    3,386,178
GRINDING GAGE

Filed Aug. 11, 1965    5 Sheets-Sheet 1

INVENTORS
KENT B. ARNOLD
PHILIP S. ARNOLD

BY *Ross W. Campbell*

ATTORNEY

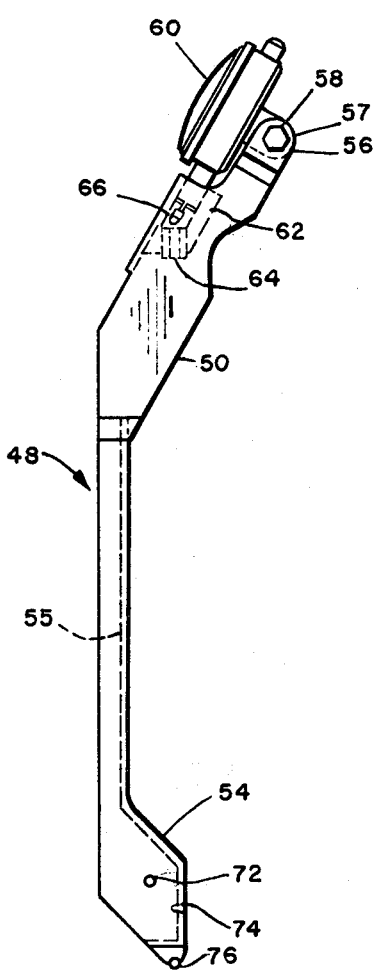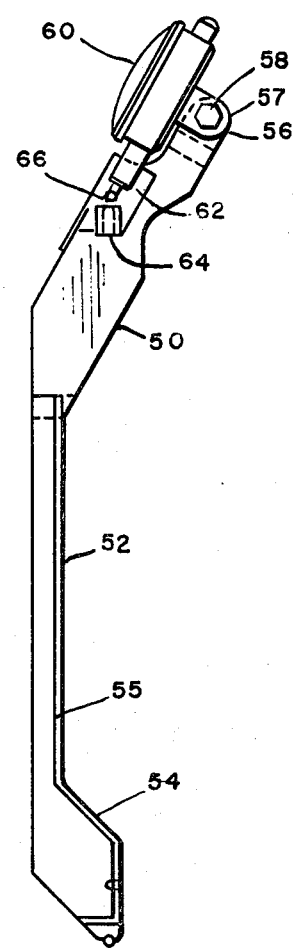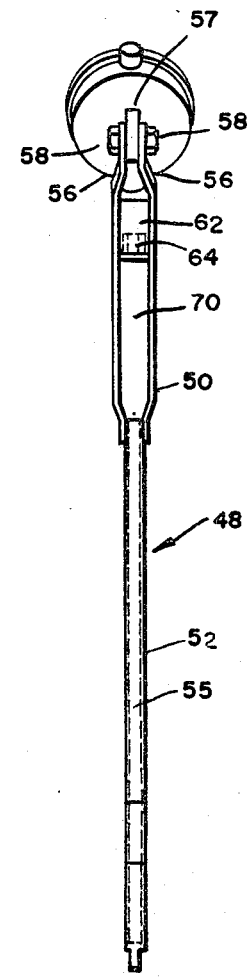

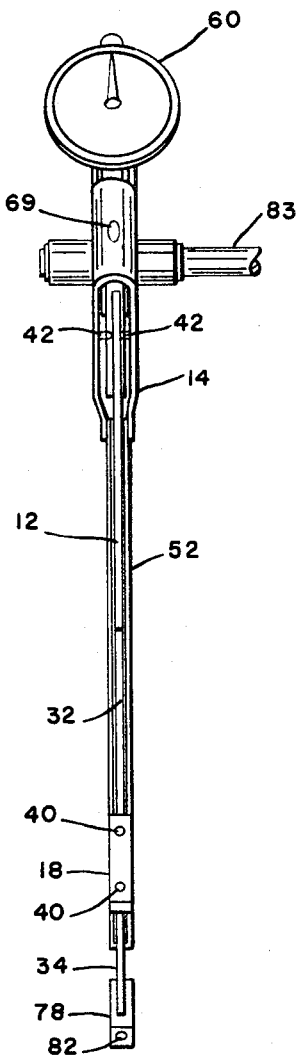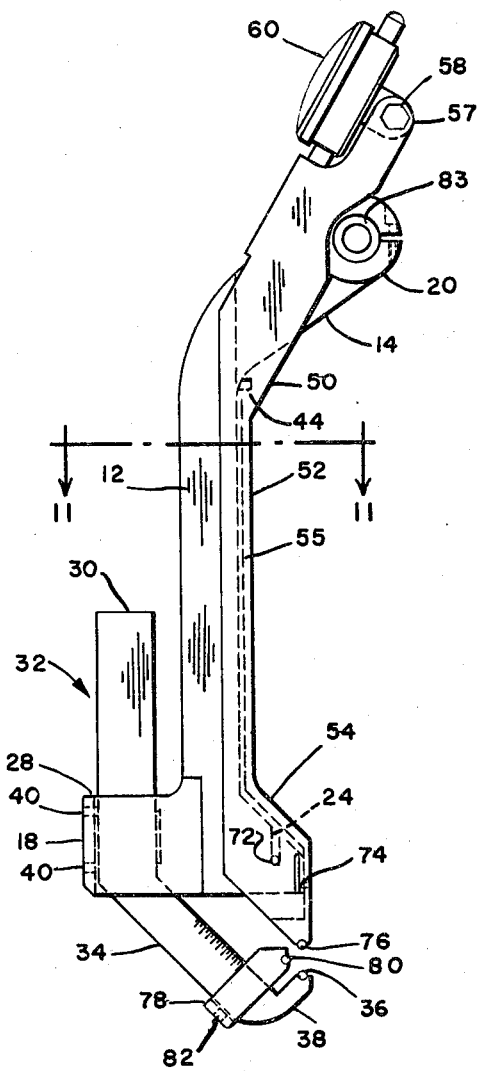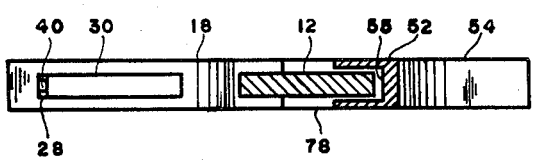
FIG. 8
FIG. 6
FIG. 11
INVENTORS
KENT B. ARNOLD
PHILIP S. ARNOLD
BY *Ross M. Campbell*
ATTORNEY United States Patent Office 3,386,178
Patented June 4, 1968

3,386,178
GRINDING GAGE
Philip S. Arnold, Flint, Mich.; John M. Wright, executor of said Philip S. Arnold, deceased; and Kent B. Arnold, 3321 E. Court St., Flint, Mich. 48506
Filed Aug. 11, 1965, Ser. No. 478,856
1 Claim. (Cl. 33—178)

ABSTRACT OF THE DISCLOSURE

A gage for production grinding operations to determine when the desired diameter of a workpiece has been achieved. The gage includes a frame element adapted for pivotal mounting to the grinding machine and carrying one of the two contact points necessary for determining the diameter of the workpiece. A plunger element is slidably mounted with respect to the frame element and is provided with the other contact point in engagement with the workpiece. An indicator has a dial for indicating the relative distance between the contact points and thus the diameter of the workpiece.

---

The present invention relates to grinding gages and more particularly to a grinding gage having a single moving element.

Conventional grinding gages include several moving elements. Each moving element introduces friction and hence inaccuracy into the gage. The degree to which fine measuring can be attained by a grinding gage is in inverse proportion to the amount of friction within the gage.

It is accordingly an object of the present invention to provide a grinding gage having improved measuring sensitivity.

Another object is to provide a grinding gage having a single moving element.

Another object is to provide a grinding gage having the indicator mounted upon a single moving element which is in direct contact with a workpiece.

Still a further object of the invention is to provide an improved grinding gage which is simple and inexpensive to manufacture, light and rugged in construction.

Briefly, the present invention is characterized by a frame element adapted to be yieldingly retained by a conventional spring loaded grinding gage mounting in contact with a point on the workpiece to be ground, and a plunger element slidingly engaged with said frame element, bearing a conventional dial indicator or the like near the upper end thereof in operative engagement with said frame element, and the plunger element resting upon the opposite surface of said workpiece. The mounting floatably supports the entire gage and retains the frame element in constant contact with the lower surface of the workpiece, and the weight of the plunger element and indicator maintain the lower end of the plunger element in contact with the upper surface of the workpiece as the diameter of the workpiece is reduced by grinding. Friction between the workpiece and the lower contact point maintains a third contact point in contact with the forward surface of the workpiece. The indicator measures relative longitudinal movement between the frame and plunger elements, and hence the change in diameter of the workpiece.

Other features, advantages and objects will become readily apparent from the following description and the accompanying drawings.

In the accompanying drawings, wherein like characters are employed to designate like parts throughout the same:

FIGURE 3 is a side view of the plunger and indicator of an improved grinding gage, showing in dotted lines the channel of the trunk and boot.

FIGURE 4 is a side sectional view in section of the plunger and indicator of an improved grinding gage.

FIGURE 5 is a rear view of the plunger and indicator of an improved grinding gage, showing in dotted lines the channel of the trunk and boot.

FIGURE 6 is a side view of an assembled grinding gage, showing in dotted lines the channel of the trunk and boot of the moving element and the portion of the frame element received therein.

FIGURE 8 is a front view of an assembled grinding gage.

FIGURE 11 is an enlarged cross-sectional view taken along line 11—11 of FIGURE 6.

Figures 1, 2:
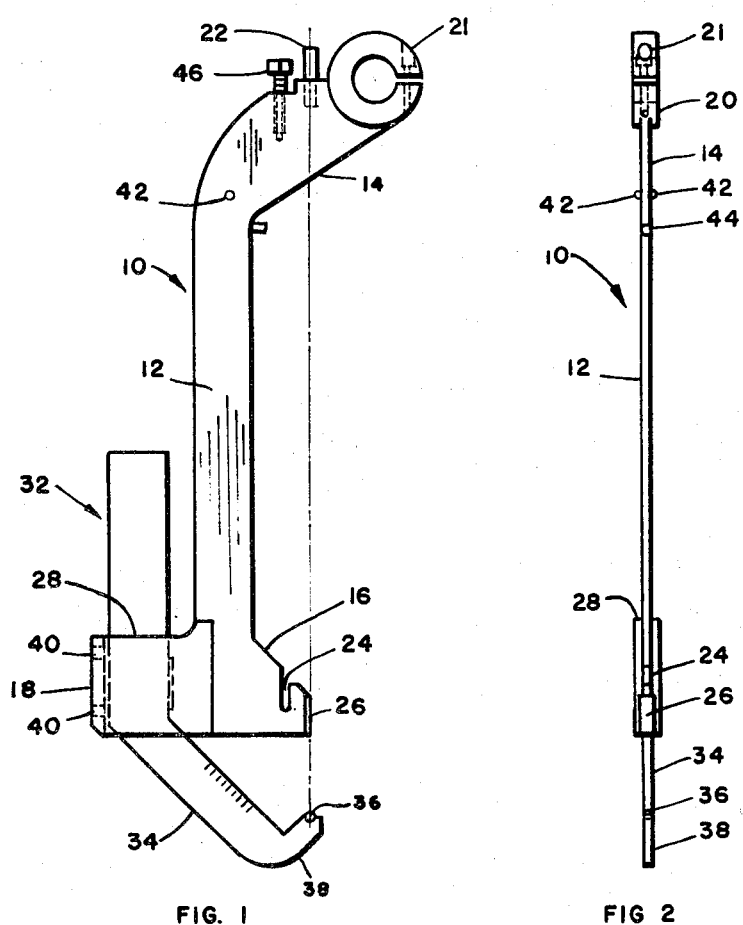
FIGURE 1 is a side view of a frame element of an improved grinding gage.
FIGURE 2 is a rear view of a frame element of an improved grinding gage.
Figure 7:
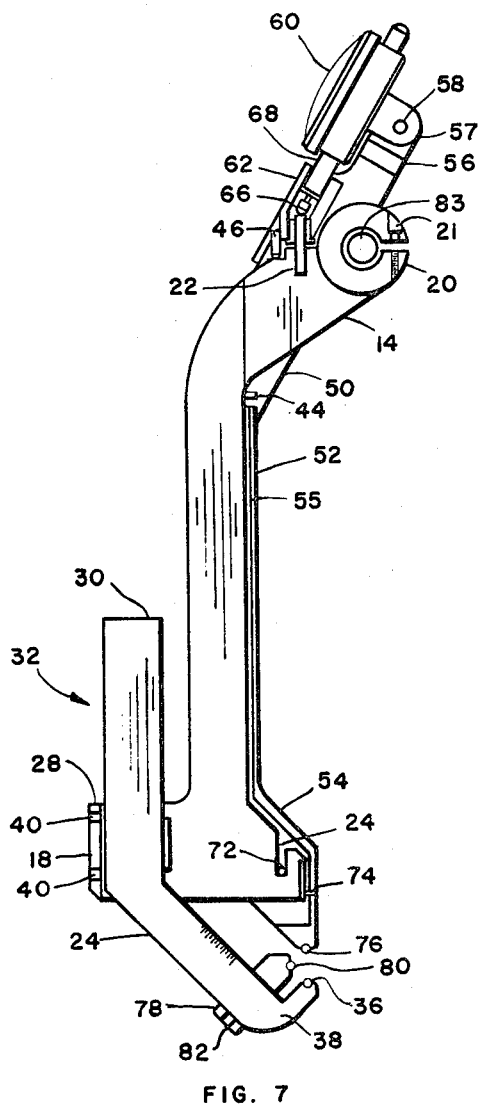
FIGURE 7 is a side sectional view of an assembled grinding gage.
Figure 9:
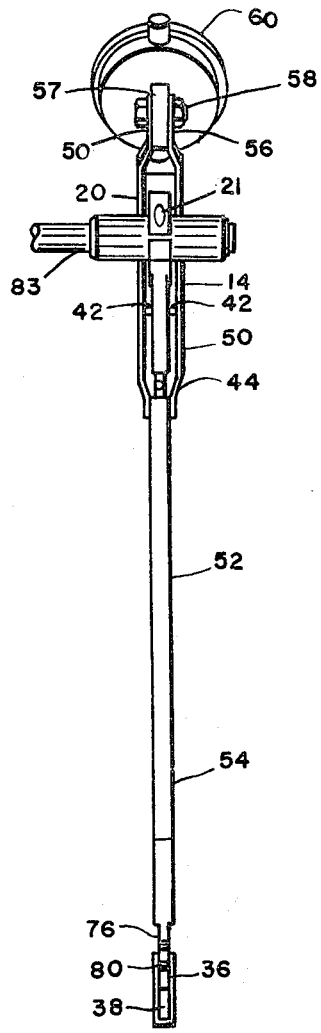
FIGURE 9 is a rear view of an assembled grinding gage.

Referring now more particularly to the drawings, generally indicated 10 and best shown in FIGURES 1 and 2 is the frame element of our invention, which includes an elongated trunk 12 of rectangular cross-section bearing a rearwardly directed head 14 at the upper end thereof, and a rear extension 16 and a forward extension 18 at the lower end thereof. Head 14 bears mounting means, such as split clamping ring 20, a clamping screw 21, and an upstanding guide pin 22. Rear extension 16 bears a slot 24 in the upper edge thereof and a flat lower bearing surface 26 on its rear edge. Forward extension 18 has a rectangular aperture 28 extending vertically therethrough and adapted to receive the upper portion 30 of a caliper element generally indicated at 32 the lower portion 34 of which is marked with graduations and bears a lower contact point 36 on an upwardly inclined extension 38 thereof. A pair of set screws 40, 40 permit forward extension 18 to securely but adjustably retain caliper element 32 within aperture 28. Guide pin 22, lower bearing surface 26, and lower contact point 36 are in substantial alignment.

A pair of bearing points 42, 42 extend from opposite sides of trunk 12 near its juncture with head 14, a rear stop screw 44 is threadably engaged in the rear edge of the trunk slightly below said juncture, and an upper stop screw 46 is threadably engaged upon a vertical axis in the upper edge of the head forwardly of guide pin 22, all for purposes more particularly hereinafter described.

A single moving element or plunger generally indicated at 48 and best shown in FIGURES 3, 4, and 5 is provided and includes a rearwardly channelled head 50, an elongated trunk 52, and a rearwardly extending boot 54 at the lower end thereof. An elongated channel 55 is formed in the front of trunk 52 and boot 54 and extends deeply into the boot to cause the boot to be hollow, so as to adapt the trunk and boot to receive, respectively, the trunk 12 and rear extension 16 of frame element 10, as hereinafter described.

Head 50 bears a pair of upper extensions 56, 56 having apertures therein and forming a split bracket 57 disposed to receive a nut and bolt combination 58 supporting a conventional dial indicator 60. A metal block 62 is brazed or otherwise rigidly supported within head 50 and has a vertical bore 64 therein arranged to receive guide pin 22 from below and to dispose same for contact with the tip 66 of the movable element slidingly disposed within the downwardly directed stem 68 of indicator 60. Guide pin 22 and bushing 64 are lapped to reduce friction there-between to a minimum. An aperture 70 is provided in the forward edge of head 50, below block 62, to permit passage forwardly therethrough of head 14 of frame element 10, in the manner and for the purpose more particularly hereinafter described. A recess 69 is provided in the forward edge of head 50 immediately above aperture 70 to permit adjustment of stop screw 46.

Boot 54 bears a horizontal crosspin 72 which extends across the hollow interior of the boot and is adapted to be received within vertical slot 24 of rear extension 16 of frame element 10. A forwardly directed carbide bearing point 74 is mounted upon the vertical, interior, rear surface of boot 54 and is disposed to bear against bearing surface 26 of the rear extension 16. An upper plunger contact point 76 is mounted upon the extreme lower end of plunger 48. A contract point bracket 78 bearing a third contact 80 is securely but adjustably mounted upon the lower portion 34 of caliper element 32 by a set screw 82, to position contact points 36 and 76 upon a chord near a substantially vertical diameter of the workpiece prior to commencement of the grinding operation.

To assemble the device, rear stop screw 44 is removed and stop screw 46 is fully engaged within head 50. Head 14 is then inserted rearwardly through aperture 70 in plunger 48 and the upper end of guide pin 22 is inserted upwardly into the lower end of bore 64 of block 62 of the plunger. Trunk 12 of frame element 10 is then inserted into slot 55 of trunk 52 of plunger 48, bringing crosspin 72 into position above and in alignment with slot 24 with carbide point 74 resting against bearing surface 26. Guide pin 22 is then in alignment with bore 64. Frame element 10 is then slid upwardly within plunger 48 to engage guide pin 22 fully within bore 64 and crosspin 72 within slot 24. It will be noted that bearing points 42, 42 slidingly contact the opposing inner sides of head 50 and prevent rotational side play between frame element 10 and plunger 48.

Stop screw 44 is then threadably inserted into its respective threaded aperture in trunk 12 of frame element 10 and extends rearwardly above the upper end of trunk 52 thus limiting the extent of upward movement of the trunk and hence of plunger 48 with respect to frame element 10. Upper stop screw 46 extends vertically upward within aperture 70 in alignment with the underside of head 50 and is now adjusted so as to appropriately limit the extent of downward movement of plunger 48 with respect to frame element 10 for minimizing indicator wear when the gage is removed from the workpiece.

In operation, clamping ring 20 is pivotally connected in the conventional manner to the arm 83 of a conventional torsion spring-loaded grinding gage mounting 84 which extends forwardly from the guard 86 of the conventional abrasive grinding wheel 88 of a grinding machine, thus supporting the grinding gage in operative contact with a cylindrical workpiece 90. Workpiece 90 is axially supported and arranged to be rotated during grinding upon spindles (not shown) in the conventional manner. The position of bracket 78 is then adjusted upon the lower portion 34 of caliper element 32 so that contact point 80 contacts workpiece 90 near the radius of the workpiece which forms a right angle with the axis of contact points 36 and 76, the graduations marked upon element 32 facilitating such adjustment. Contact point 36 is yieldingly urged upwardly by mounting 84 so as to be maintained in continuous contact with the lower surface of the workpiece as the diameter of the workpiece is reduced by grinding. The rotary motion of workpiece 90 during grinding creates friction between the workpiece and contact point 36, urging the contact point and the entire gage assembly pivotally rearward about pivot means 83 and maintaining contact point 80 also in constant contact with the workpiece. Contact point 76 of plunger 48 contacts the upper surface of the workpiece and, sliding downward upon frame element 10 under force of gravity, remains in contact with the workpiece throughout the grinding operation. Upper portion 30 of caliper element 32 is adjusted within aperture 28 of forward extension 18 of frame member 10 so that the hand of indicator 60 is in approximately the desired position. The dial of the indicator is then rotated in the usual manner to set it at the exact reading desired. It will be noted that the trunk 52 of plunger element 48 is set set back somewhat from the axis of head 14 and workpiece 90 so as to allow clearance for the conventional water nozzle 92 of the grinding machine.

Figure 10:
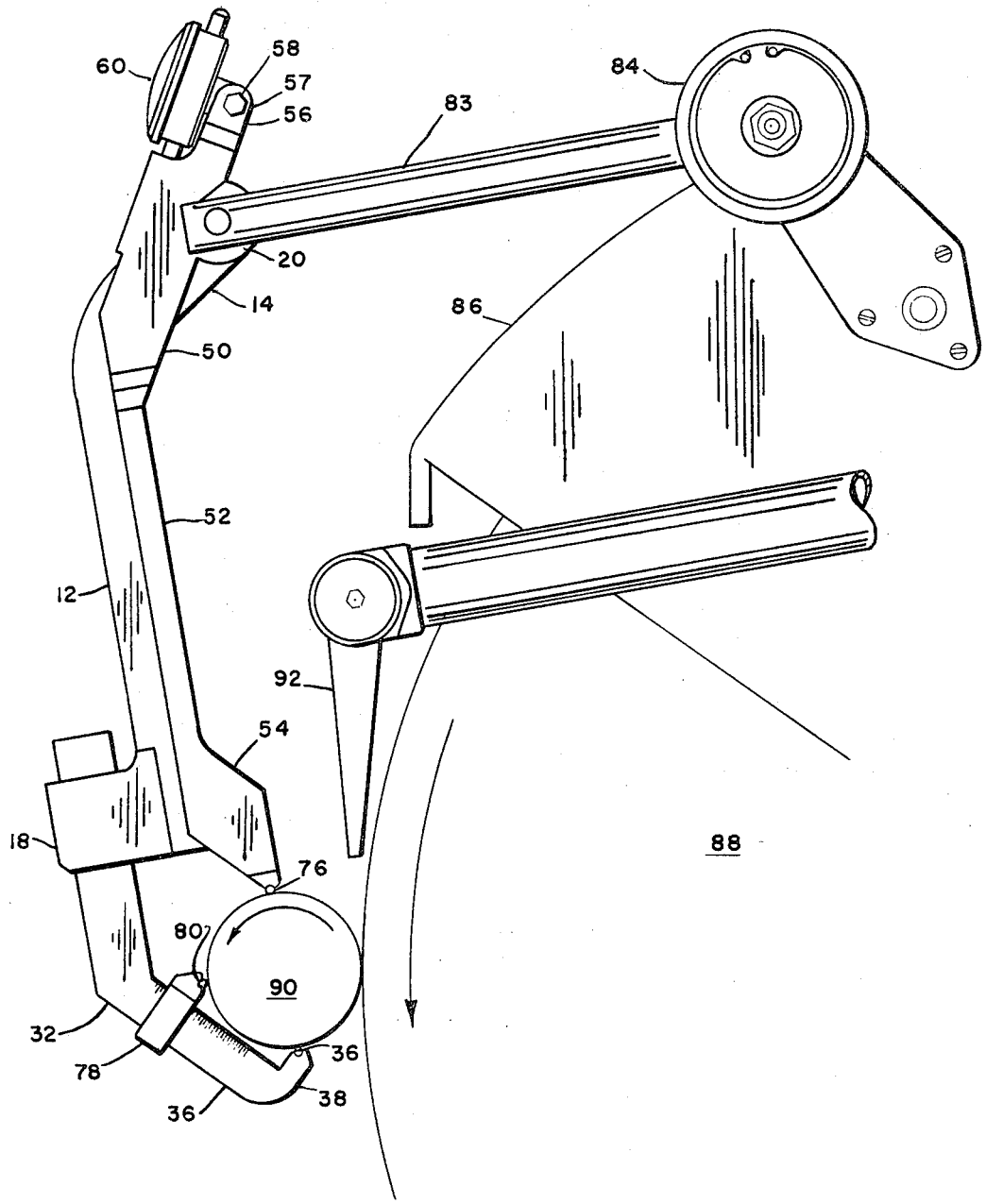
FIGURE 10 is a view of an improved grinding gage in operation.

Indicator 60 is set in the conventional manner before the grinding operation commences. Grinding is then commenced, the grinding wheel 88 rotating in the conventional direction shown by the arrow in FIGURE 10. As the diameter of workpiece 90 is reduced during the grinding operation, mounting 84 elevates frame element 10 so as to retain contact point 36 in contact with the underside of the workpiece, and the weight of plunger 48 and indicator 60 causes the plunger to slide downward with respect to frame element 10. The relative upward movement of guide pin 22 is transmitted to indicator 60 through tip 66 in direct proportion to the extent of such downward movement, and causes the indicator to register the change in length of the chord of the workpiece upon which lie contact points 36 and 76. Friction between the plunger 48 and frame element 10 is reduced to an absolute minimum and occurs only at the carefully prepared points of contact between carbide point 74 and bearing surface 26, between guide pin 22 and bore 64, and between bearing points 42, 42 and the inner sides of head 50. When grinding is completed and the gage removed from the workpiece, stop screw 46 limits relative movement of plunger 48 and frame element 10 so as to prevent excessive movement of and shock to indicator 60 if the plunger drops downwardly with respect to the frame element.

It will be particularly noted that indicator 60 is mounted upon plunger element 48, rather than frame element 10 as is conventional. It will also be noted that indicator 60 is mounted in an upright position, at a high level and in a convenient attitude for reading by the operator. The upright position of the indicator prevents dust and grime from entering the indicator about stem 68 by effect of gravity.

The simple construction of the two elements 10 and 48 of the gage make it extremely easy and inexpensive to manufacture and adapt it to mass production. The light weight and ruggedness of construction facilitate shipping and handling thereof. There is very little precision work required in the manufacture of the gage. The only necessary precision fit is between guide pin 22 and bore 64 of block 62 within which the guide pin slides; otherwise, the entire structure of the gage can be relatively rough and yet still perform to give accurate results. Crosspin 72 need only fit within slot 24 sufficiently to be roughly retained thereby, since the precise positioning of the lower end of plunger 48 relative to frame element 12 is accomplished by bearing point 74 riding in contact with bearing surface 26. Contact between bearing point 74 and bearing surface 26 is assured by the forward drag imparted to upper contact point 76 by the forward movement of the upper surface of the workpiece with which it is in contact, since the workpiece is always rotated in a forward direction, as shown by the arrow in FIGURE 10, during grinding.

In production grinding operations, wherein piece after piece of stock are ground to the same diameter, the gage performs as a comparator, indicating when each workpiece in turn reaches the same diameter, and the relative positions of contact points 36, 76, and 80 will be the same at that time in each case. Thus, while we have shown contact points 36, 76, and 80 as lying upon diameters of workpiece 90 in FIGURE 10, it will be understood that they may, and usually will, lie on chords of the workpiece which constantly change as the diameter of the workpiece is reduced during grinding.

While we have shown a conventional mechanical dial indicator 60 utilized with our invention, it should be understood that any form of transducer, such as an air cartridge or electronic pick-up, can be substituted for the dial indicator without departing from the spirit and scope of our invention. Also, if it is desired to utilize our invention with the longitudinal axis of the plunger disposed horizontally, spring or equivalent means may be employed as a substitute for gravity to urge the contact point of the plunger against the workpiece.

What is claimed is:
1. A grinding gage comprising,
   an elongated frame element having a trunk and a pair of bearing points on opposite sides of said trunk,
   a rearwardly directed head at the upper end of said frame member bearing mounting means and an upstanding guide pin,
   a rear extension at the lower end of said frame member having a rearwardly directed lower bearing surface and a notch,
   a caliper element supported by and extending below said frame member and bearing a lower contact point adapted to contact the lower surface of a workpiece,
   said upstanding guide pin, lower bearing surface and lower contact point being in alignment upon a first axis parallel to the longitudinal axis of said trunk of said frame member,
   a contact point bracket adjustably supported upon said caliper element and bearing a contact point adapted to contact the forward surface of said workpiece upon the center line thereof forming a right angle with said sliding axis,
   an elongated plunger having a trunk with an elongated channel in the forward edge thereof adapted to receive said trunk of said frame member,
   an upper contact point at the lower end of said plunger adapted to contact and rest upon the upper surface of said workpiece,
   a rearwardly inclined, rearwardly channeled head at the upper end of said plunger bearing an aperture in its forward edge adapted to receive said head of said frame member rearwardly therethrough and a bore adapted to slidingly receive said guide pin from below,
   a rear stop screw in the rear of said trunk of said frame member disposed to limit upward movement of said plunger with respect to said frame member,
   an upper stop screw in said head of same frame member disposed to limit downward movement of said plunger with respect to said frame member,
   a rearwardly extending boot at the lower end of said plunger bearing a deep channel in the front thereof adapted to receive said rear extension of said frame member, a crosspin adapted to be received within said notch, and a forwardly directed bearing point disposed to bear against said bearing surface,
   said bore, upper contact point, and bearing point of said plunger being in alignment upon a second axis parallel to the longitudinal axis of said trunk of said plunger,
   said plunger and frame element being adapted for mutual sliding engagement with said first and second axes in alignment and, between the limits of contact provided by said stop screws and bearing points on said trunk of said frame member, mutual contact only between said guide pin and bore and between said bearing point and bearing surface,
   and means for mounting an indicator upon said plunger in upright position with the stem of said indicator in operative contact with said frame member and disposed to indicate relative movement between said plunger and frame member responsive to change in diameter of said workpiece.

References Cited

UNITED STATES PATENTS

| | | | |
|---|---|---|---|
| 1,815,049 | 7/1931 | Cole | 33—147 X |
| 2,249,904 | 7/1941 | Lewis | 33—178 |
| 2,447,612 | 8/1948 | Dowe | 33—147 |
| 1,638,425 | 8/1927 | Whittemore | 33—147 |
| 2,017,876 | 10/1935 | Tripolitis | 33—147 |

SAMUEL S. MATTHEWS, *Primary Examiner.*